United States Patent [19]
Brownlie et al.

[11] Patent Number: 5,276,279
[45] Date of Patent: Jan. 4, 1994

[54] SURFACE MOUNT OUTLET

[75] Inventors: Alan W. Brownlie, Skaneatles, N.Y.; Ned A. Sigmon, Clemmons; Randy G. Simmons, Winston-Salem, both of N.C.

[73] Assignee: The Whitaker Corporation, Wilmington, Del.

[21] Appl. No.: 830,102

[22] Filed: Feb. 3, 1992

[51] Int. Cl.$^5$ .............................................. H02G 3/08
[52] U.S. Cl. ..................................... 174/65 R; 174/50
[58] Field of Search ........................................... 174/65

[56] References Cited

U.S. PATENT DOCUMENTS 4,659,166 4/1987 Morningstar et al. .
4,795,356 1/1989 Pauza ................................. 439/225
4,884,982 12/1989 Fleming et al. .................... 439/620

OTHER PUBLICATIONS

"Installation Procedure for the Siecor UTS-Information Outlet", Siecor Corporation, Hickory N.C., Oct. 1989, pp. 1-4.
"Siecor Universal Transport System Information Outlet (UTS-10)", Seicor Corp., Hickory N.C., pp. 1-4 Jun. 27, 1990.
Product Sheet Advanced Communication Outlet, BRIntec Corp., Willimantic, Conn., pp. 1-3.
Now, Communications Wiring is Easy, Flexible and Limitless with Networker TM from Hubbell.

Primary Examiner—Harold Broome
Attorney, Agent, or Firm—Gerald K. Kito

[57] ABSTRACT

An outlet (1) or communications cable (17), includes, an enclosure (2) defined by a base (3) and a cover (4), a cable receiving opening (8) in the base (3), multiple interchangeable plates (5) adapted for removable mounting along sides (23) of the enclosure (2), and each of the plates (5) being removable for replacement by one of the plates (5) having a connector receiving opening (6) adapted to receive a data connector (20) connected to a cable (17) received by the cable receiving opening (8).

11 Claims, 9 Drawing Sheets

SURFACE MOUNT OUTLET

FIELD OF THE INVENTION

The invention relates to an outlet for communications cable and for holding receptacle connectors to which apparatus including telephones and computers can be plugged and unplugged with ease.

BACKGROUND OF THE INVENTION

Telephone cable represents one type of communications cable linking together telephones in various offices and work areas. Computers in various offices and work areas are linked to one another by communications cable that can be coaxial cable and fiber optic cable, for example An outlet is a device located along the communications cable providing a convenient place to plug in the telephones and computers. The telephones and computers have plug type data connectors for plugging into receptacle type data connectors. The outlet must be constructed with the receptacle type data connectors for connection on the communications cable, and for mating with the plug type data connectors of the telephones and computers.

SUMMARY OF THE INVENTION

The invention was developed to fulfill a need for an outlet that is readily adaptable with data connectors of different types, and for connection to communications cable of different types. The invention further permits ease of installation of various types of data connectors in an outlet. The outlet is adapted for mounting to a floor, or to single or double ganged outlet wall boxes, or to a plaster ring used to mount such boxes, or to an item of furniture, and for providing outlets for data cable in the corresponding floor, outlet box, plaster ring or item of furniture.

An outlet for communications cable, according to the invention resides in, an enclosure defined by a base and multiple sides projecting from the base, a cover for covering the enclosure, a cable receiving opening in the base, multiple interchangeable plates adapted for being mounted along the sides of the enclosure, and each of the plates being removable for replacement by one of the plates having a connector receiving opening adapted to receive a data connector terminated to a cable received by the cable receiving opening.

DESCRIPTION OF THE DRAWINGS

The invention will now be described by way of example with reference to the drawings, in which.

DETAILED DESCRIPTION

Figure 1:
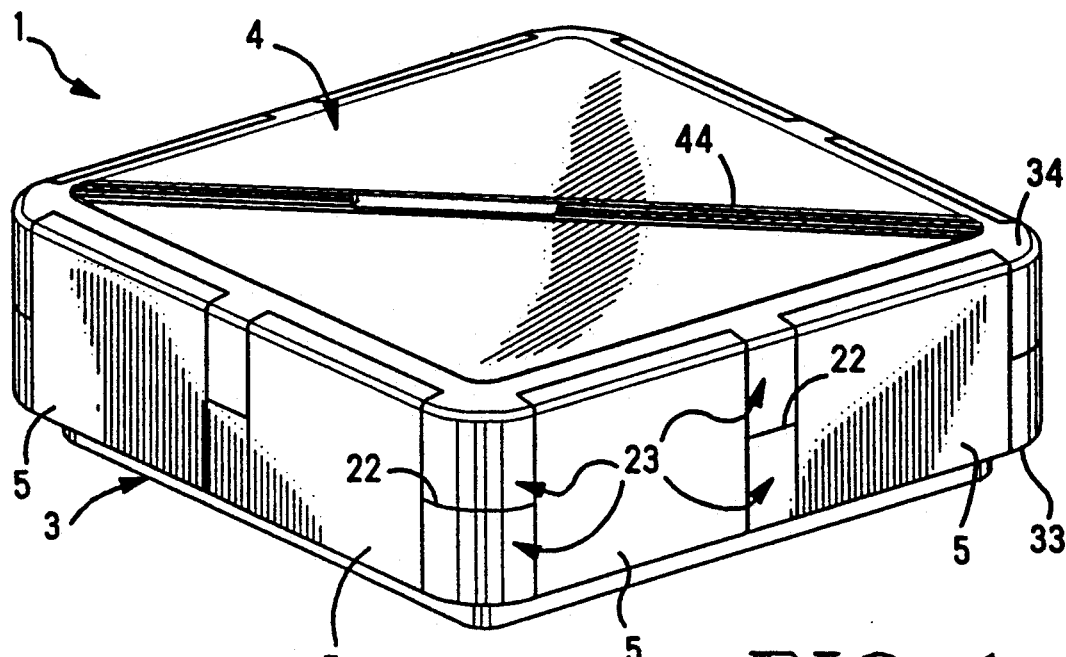
FIG. 1 is a perspective view of an outlet, the parts of which are assembled together.
Figure 3:
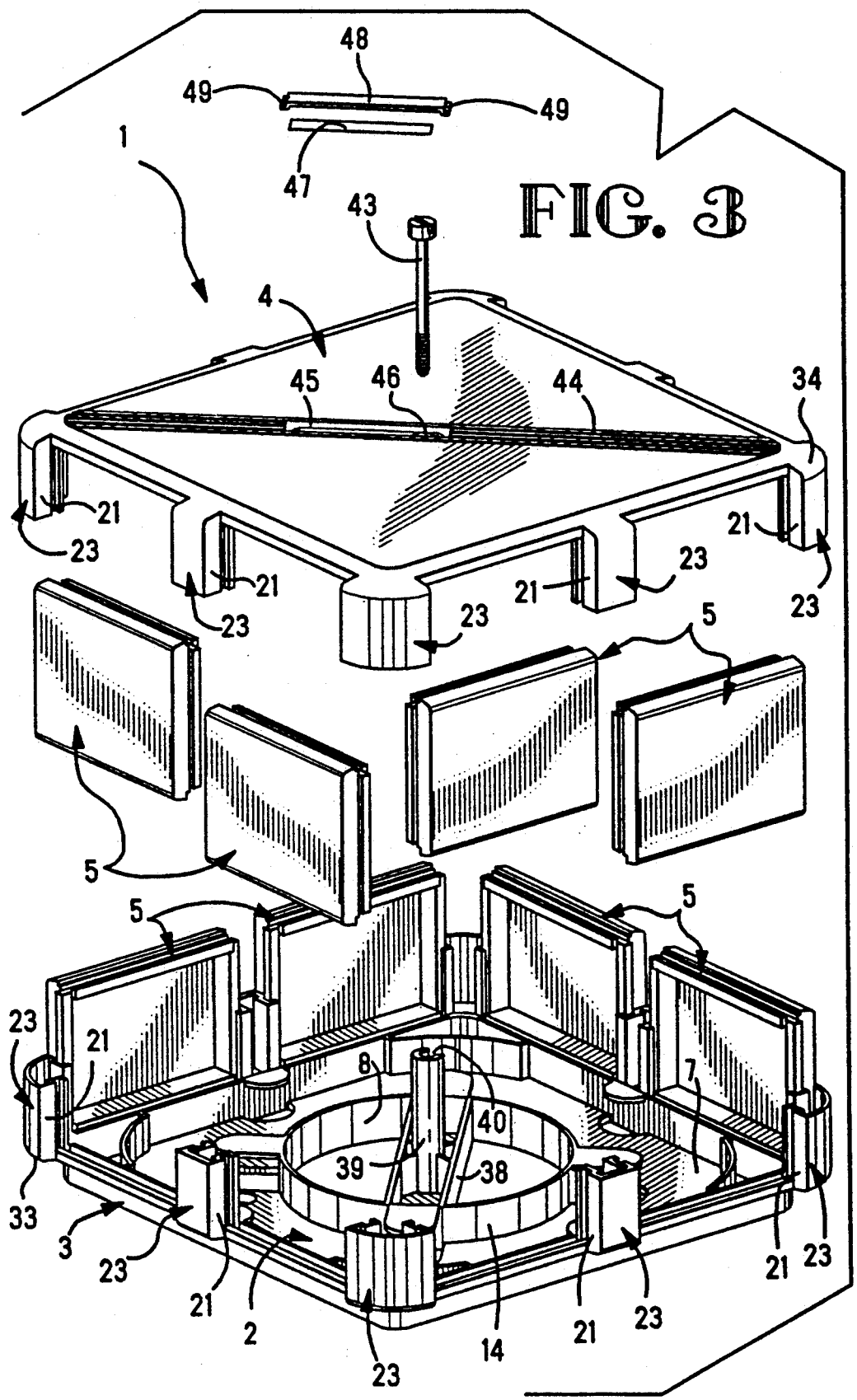
FIG. 3 is a perspective view of the outlet shown in FIG. 1 with the parts exploded apart from one another.
Figure 6:
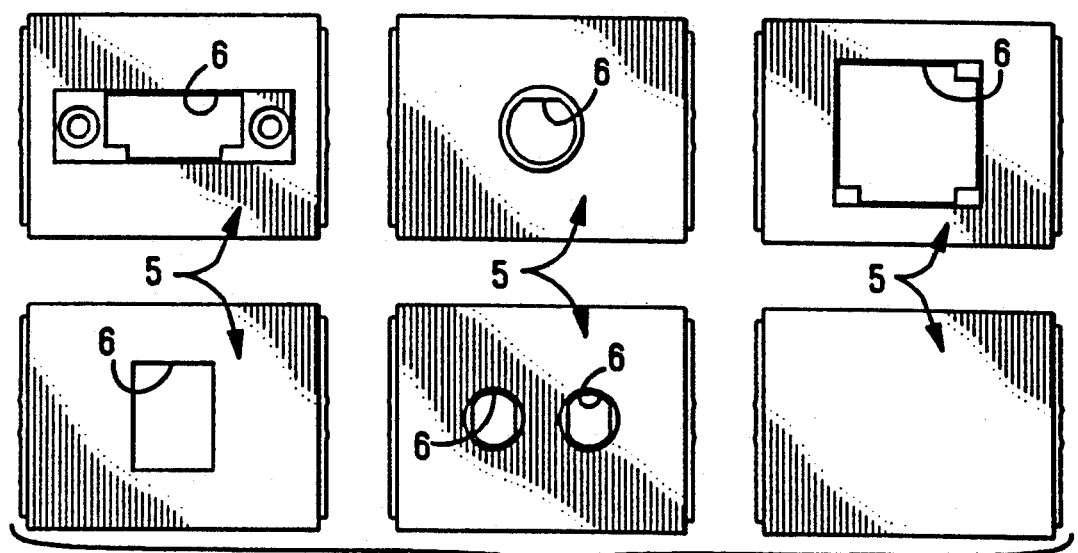
FIG. 6 is a plan view of multiple, interchangeable plates of the outlet.

With reference to FIGS. 1 and 3, an outlet 1 for communications cable, comprises, an enclosure 2 covered by and defined by a base 3 and a cover 4 and multiple plates 5, FIGS. 1, 3 and 6. The base 3 and the cover 4 are constructed such that the horizontal surfaces are exposed on both, top and bottom, sides, so as to be capable of being molded between straight draw molding dies, not shown. The vertical surfaces of the base 3 and the cover 4 are straight, so as to be capable of being molded by straight draw molding dies. The plates 5 shown in FIG. 1 are each blank, without an opening. The plates 5 of FIG. 6 are provided with connector receiving openings 6 constructed with various connector receiving shapes adapted to receive respective electrical data connectors, not shown, of different shapes and sizes. The data connectors are of known types for connecting to different electrical and optical communications cables that transmit data rather than electrical power. Such connectors are known, for example, from U.S. Pat. No. 4,795,356, requiring a correspondingly shaped opening 6 in one of the plates 5, from U.S. Pat. No. 4,884,982, requiring a correspondingly shaped opening 6 in one of the plates 5, from U.S. Pat. No. 4,659,166, disclosing multiple connectors, two of which can be received in multiple openings 6 in one of the plates 5. Other plates 5 are adapted with openings 6 for receiving other connectors, not shown.

Figure 4:
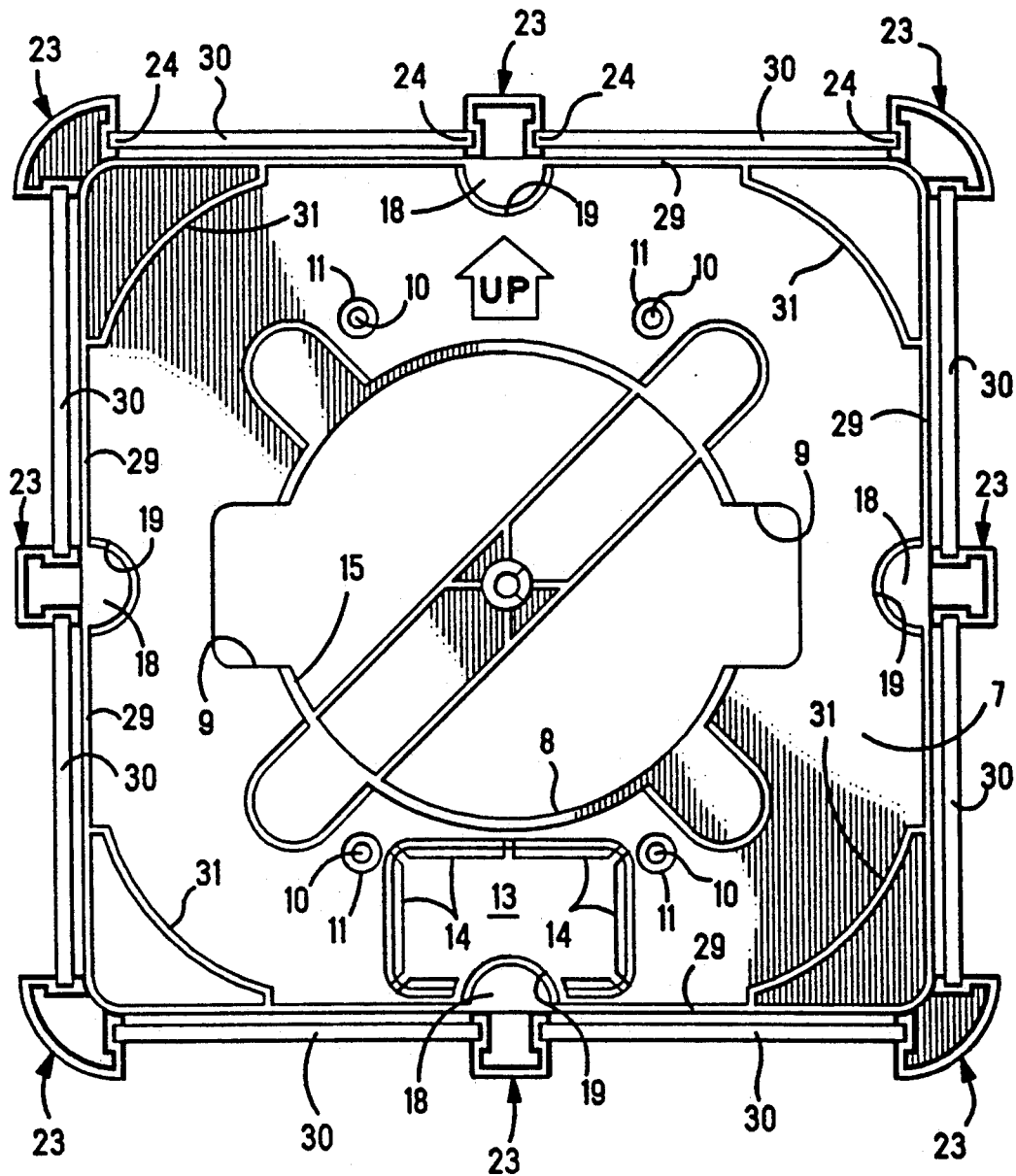
FIG. 4 is a plan view of the base.
Figure 5:
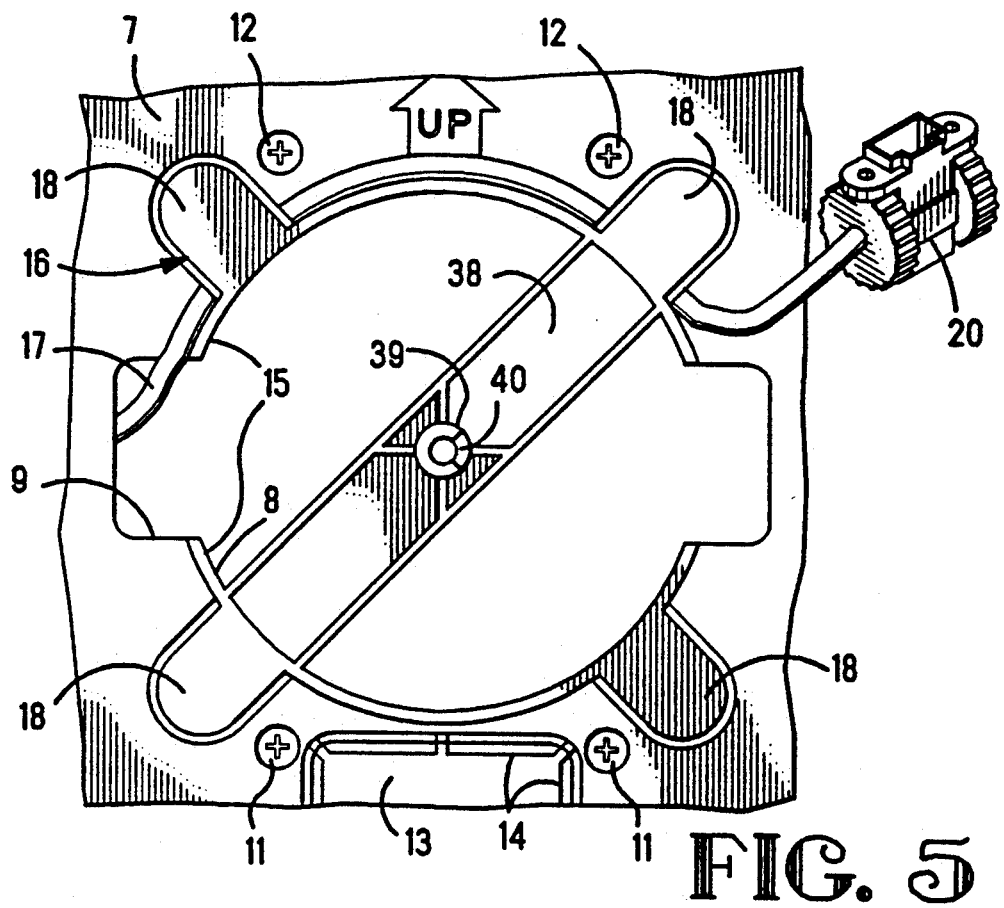
FIG. 5 is a fragmentary plan view of the base with a data cable received by the base.

With reference to FIGS. 3, 4 and 5, the base 3 is of unitary, one piece, construction, molded from plastics material. A bottom 7 of the base 3 has an enlarged, circular, cable receiving opening 8 intersected by smaller, rectangular openings 9. The bottom 7 provides an exterior mounting surface adapted for attachment to a floor, or wall box or plaster ring, or an item of furniture, not shown. The base 3 is provided with apertures 10, FIG. 4, encircled by reinforcing bosses 11, and through which fasteners 12, FIG. 5, can project for attaching the base 3. A knock out plate 13, FIG. 4, is defined by segmented slits 14 through the bottom 7 separated from one another by thin webs. The webs are frangible, whereby the knock out plate 13 is removable to create a cable receiving opening for placement against an item of furniture. One of the slits 14 is wide enough to receive a prying tool, not shown, such as the shank of a screwdriver, to pry the knock out plate 13 and break the webs.

A raised reinforcing rib encircling the cable receiving opening 8 projects into the enclosure 2 and defines a spindle 15 of a bobbin 16, FIG. 5, for winding a communications cable 17 emerging from a floor or an item of furniture, and received in the rectangular opening 9, the rectangular openings 9 extending in the spindle 15 and communicating with the cable receiving opening 8. Segmented flanges 18 of the bobbin 16 overlap the spindle 15. The flanges 18 are spaced from the bottom 7 of the base 3, and are opposite corresponding openings 19 through the bottom 7 shaped like the edges of the flanges 18. The openings 19 in the bottom are aligned with the flanges 18, through which openings 19 are inserted mold core pins, not shown, for forming the flanges 18 integral with the spindle 15 during a plastics molding operation. The cable 17 connected with an electrical data connector 20, FIG. 5, emerging from the floor or from an item of furniture, is received by the cable receiving opening 8, and is wound part way around the spindle 15, with the cable 17 in registration with the rectangular opening 9. The flanges 18 overlap the cable 17 on the spindle 15. Further details of the connector 20 are disclosed in U.S. Pat. No. 4,795,356.

According to an advantage of the invention, the multiple plates 5 are interchangeable. Each of the plates 5 is removable for replacement by one of the plates 5 having a selected connector receiving opening 6, for example, the opening 6, FIGS. 8 and 9, adapted to receive the data connector 20 connected to the cable 17.

Figure 7:
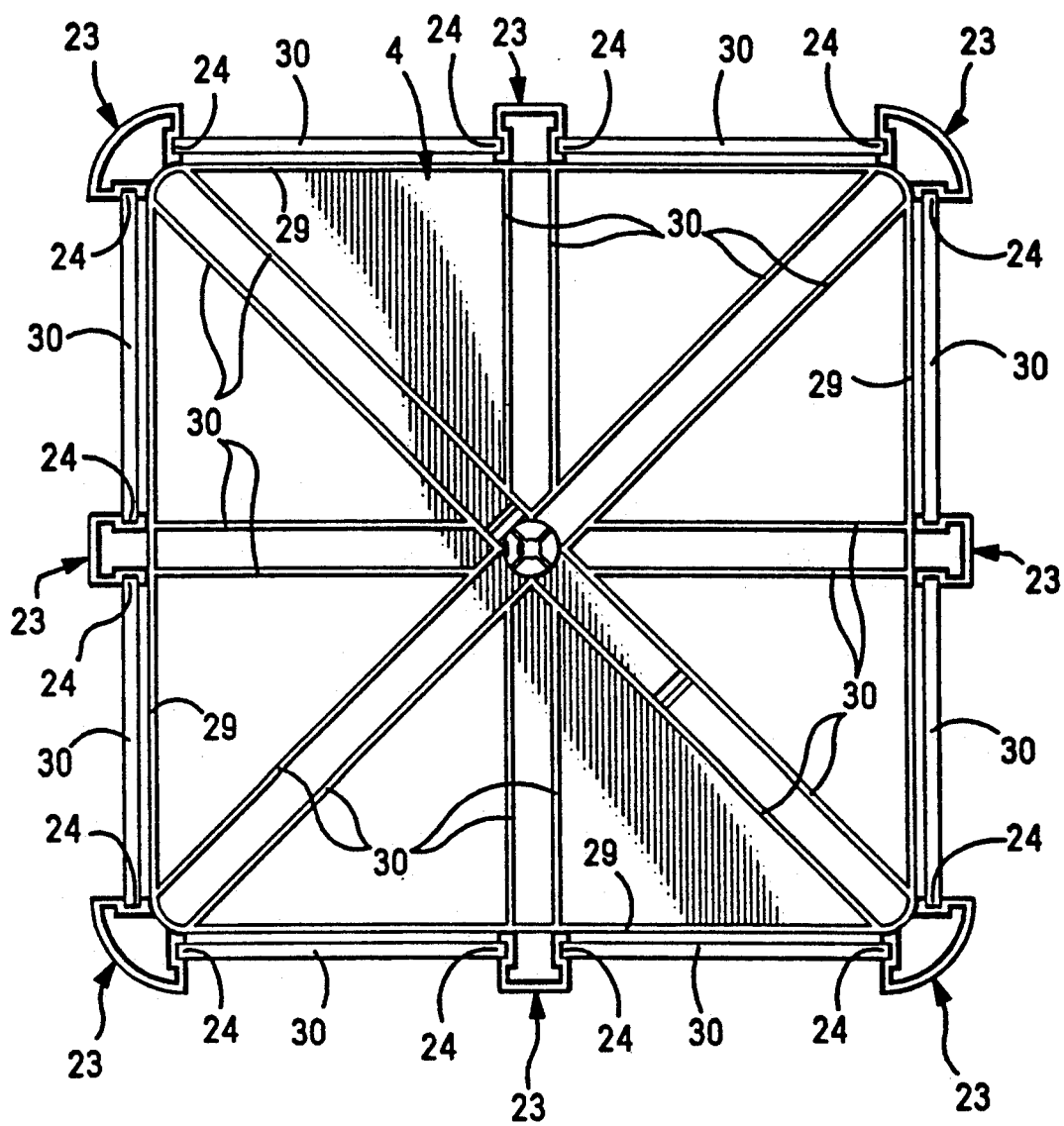
FIG. 7 is a plan view of the cover inverted.
Figure 8:
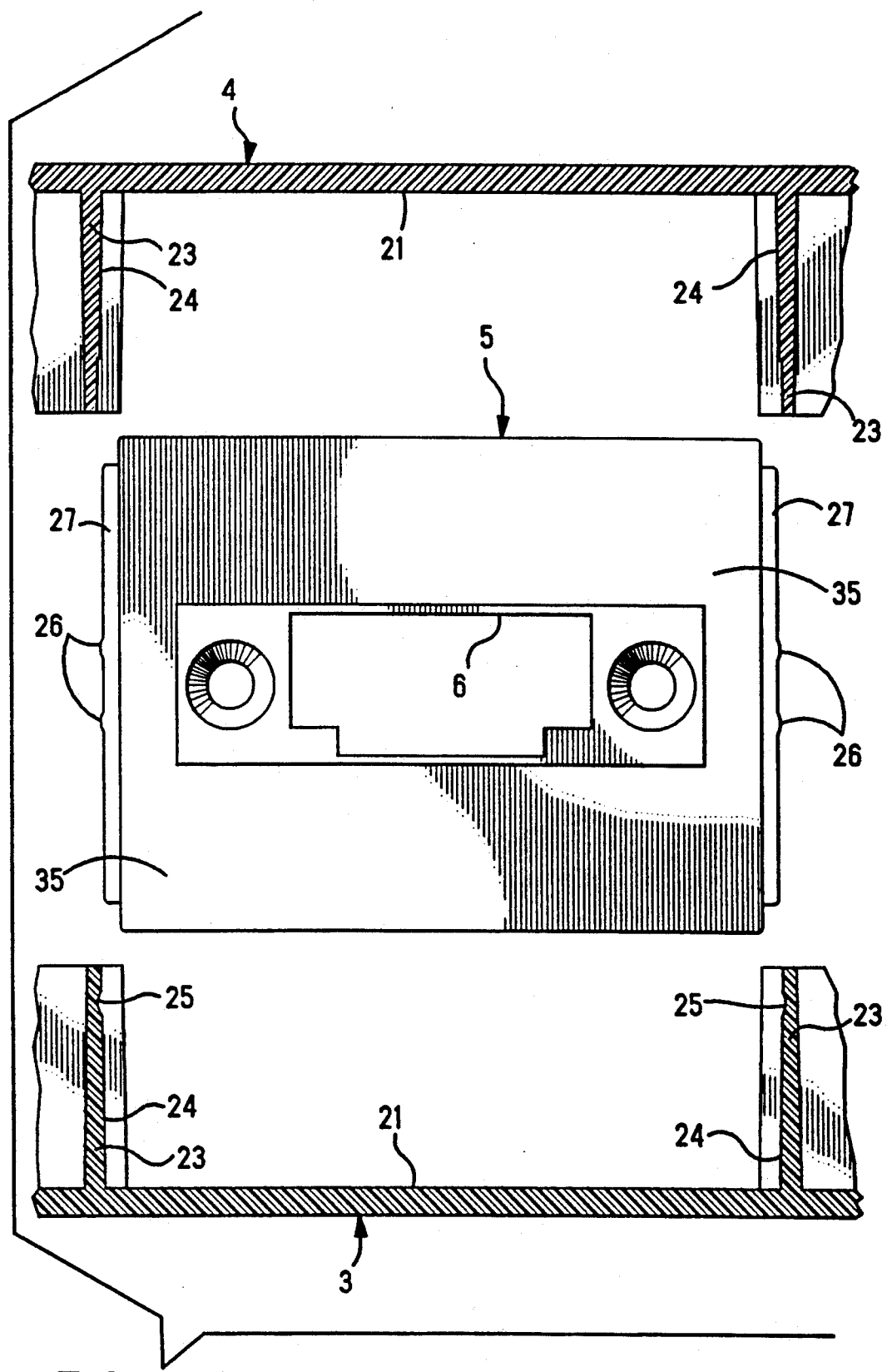
FIG. 8 is a fragmentary view of a portion of the base and cover cut away, and receiving one of the plates shown in FIG. 6.
Figure 9:
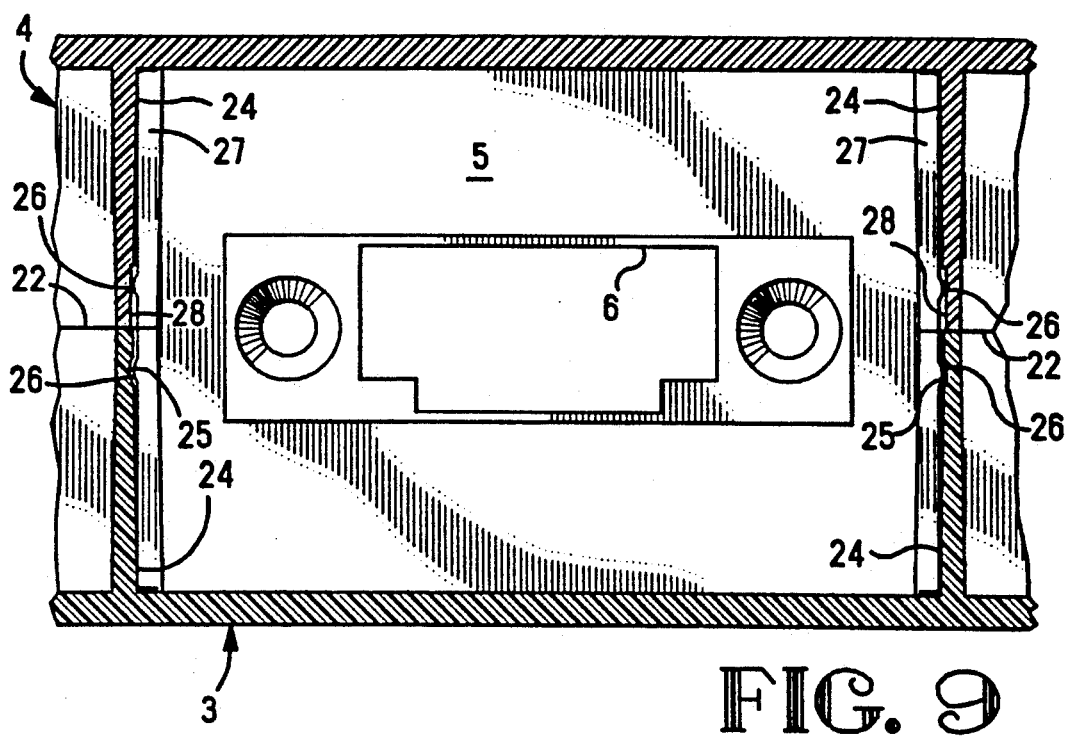
FIG. 9 is a view similar to FIG. 8 showing assembled, the base and the cover and the plate.
Figure 10:
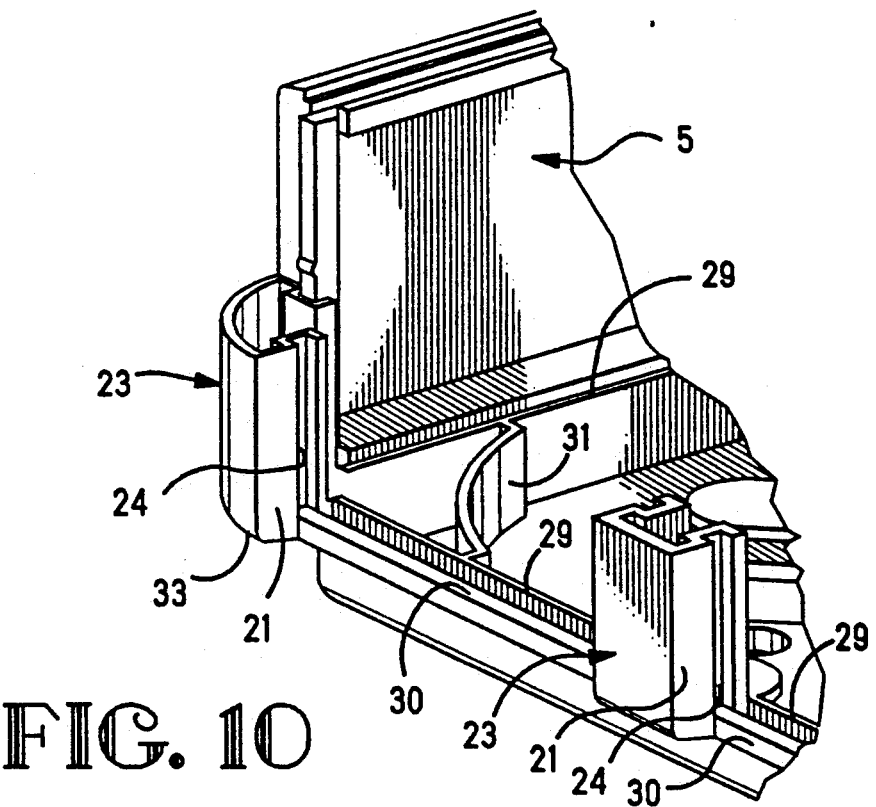
FIG. 10 is a fragmentary perspective view of a portion of the base.

The plates 5 are adapted for receipt in plate receiving openings 21, FIGS. 3 and 8, that are partly in one of the plates 5, from U.S. Pat. No. 4,659,166, disclosing in the base 3 and partly in the cover 4. Each of the plate receiving openings 21 are open along a parting line 22, FIG. 9, where the base 3 and cover 4 meet in abutment. The parting line 22 divides columns 23 of the enclosure 2. The divided columns 23, in part, are integral with the base 3, and, in part, are integral with the cover 4. The columns 23, FIGS. 4, 7 and 10, are hollow, and constructed of thin, straight walls, adapted for fabrication by molding as a unitary one piece cover. The columns 23 are spaced apart from one another, and define sides of the plate receiving openings 21. The columns 23 further define sides of the enclosure 2 extending upwardly from the bottom 7. The columns 23 separate the plate receiving openings 21 The columns 23 on the cover 4 are stacked on the columns 23 of the base 3. Grooves 24, FIGS. 8, 9 and 10, along sides of the enclosure 2, further, are along the columns 23 in both the base 3 and the cover 4. In the base 3 only, detents 25, FIG. 8, are recessed in bottoms of the grooves 24. Projecting portions 26 of flanges 27, FIGS. 8 and 9, adapt the plates 5, and more specifically the flanges 27 of sides of the plates 5, for frictional interlocking with the detents 25, FIG. 9, when the grooves 24 receive corresponding sides of the plates 5. The detents 25 are relatively near the parting line 22, such that the plates 5 are nearly fully inserted along the plate receiving openings 21 before interlocking with the base 3. Thereby, undesired interlocking is avoided until the plates 5 are fully inserted. The plates 5 are readily removed by sliding the plates 5 along the grooves 24 with sufficient force to overcome the frictional interlocking. The plates 5 are removably retained, by being interlocked with the base 3.

The plates 5 are adapted to be mounted upside down, if desired. With reference to FIGS. 8 and 9, two projecting portions 26 are distributed, evenly spaced, across a midpoint of each of the sides of the plates 5. The parting line 22 intersects the midpoint. One of the projections 26 in each side of the plates 5 will interlock with a corresponding detent 25, when the plates 5 are mounted, in corresponding positions as shown in FIG. 9, or upside down relative to that as shown in FIG. 9.

The columns 23 of the cover 4 are comprised of recesses 28 in bottoms of the grooves 24. The recesses 28 face the flanges 27 of the plates 5. The recess 28 provide clearances, FIG. 9, allowing passage of the projections 26 on the flanges 27 of the plates 5 without interlocking with the cover 4. The cover 4 can be mounted to the base 3 after all the plate receiving openings 21 are filled with interlocked plates 5 without dislodging the interlocked plates 5. Top ends of the plates 5 along the sides of the enclosure 2 define an open top of the enclosure 2. Further, the cover 4 can be removed without dislodging the interlocked plates 5 that will remain interlocked with the base 3. Replacement of the plates 5 is easily accomplished, when removal of the cover 4 will expose the contents of the enclosure 2 with the plates 5 in place on the base 3.

With reference to FIGS. 4, 7 and 10, top and bottom ends of the plate receiving openings 21 are defined by spaced apart, inner and outer, reinforcing ribs 29, 30, in the base 3, FIG. 4, and similarly, in the cover 4, FIG. 7 The cover 4 is of unitary one piece construction, molded from plastics material The cover 4, FIG. 7, has a series of raised reinforcing ribs 30 joined to the inner rib 29 and extending from each column 23 to the center of the cover 4 where the reinforcing ribs 30 intersect one another.

The inner rib 29 of the cover 4, FIG. 7, encircles the periphery of the enclosure 2. The inner rib 29 of the base 3, FIG. 4, encircles the periphery of the enclosure 2, and is cross braced and joined at corners of the periphery by curved reinforcing ribs 31, defining an outer spindle for confining a wound communications cable. The outer ribs 30 span between columns 23, joining the columns 23 at the grooves 24.

Figure 11:
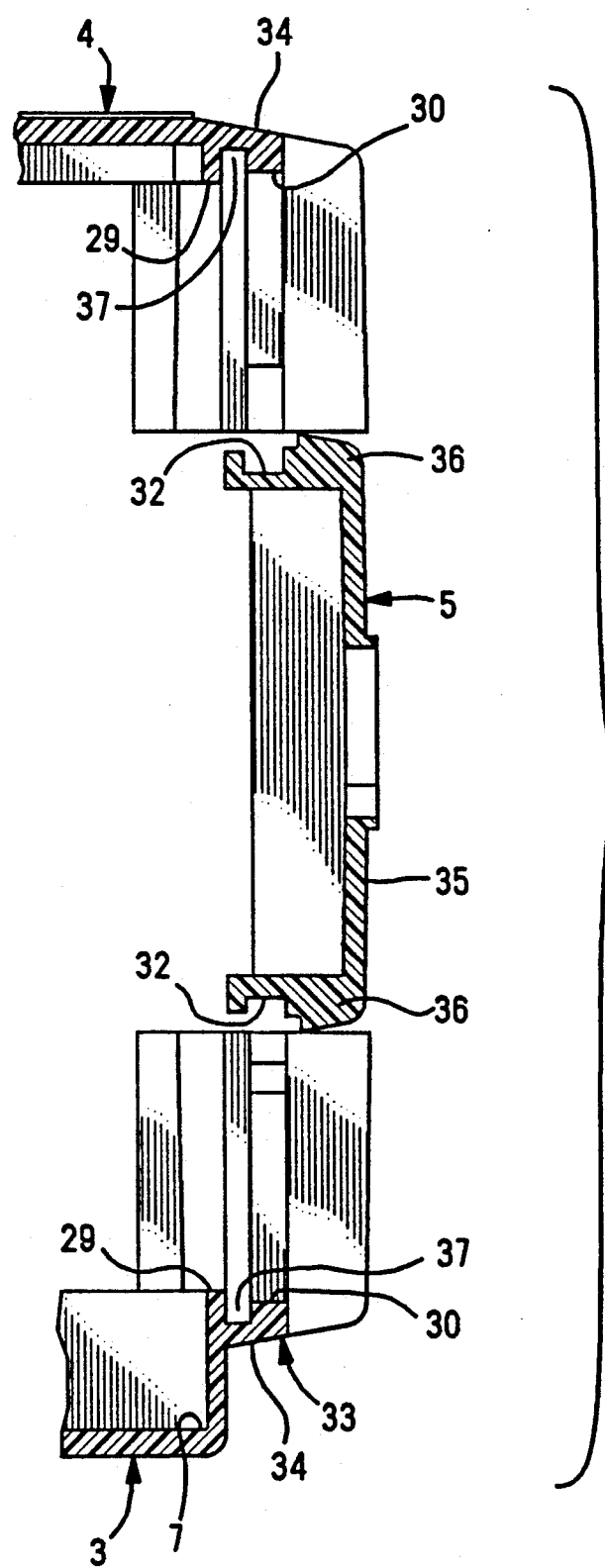
FIG. 11 is a fragmentary section view of the base, cover and plate as shown in FIG. 9.
Figure 12:
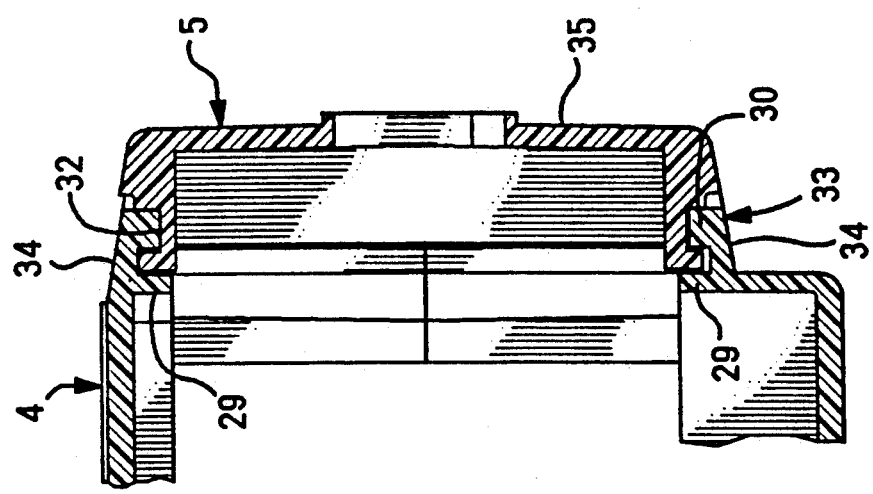
FIG. 12 is a view similar to FIG. 11, showing the base, cover and plate assembled together.

Elongated channels 32, FIGS. 11 and 12, extend along opposite ends of the plates 5 and receive the outer reinforcing ribs 30 of the base 3 and of the cover 4, the flanges 27 of the plates 5 being slidable along the grooves 24 of the base 3 until the channels 32 receive the outer rib 30 of the base 3. The plates 5 interlock with the detents 25 to retain the plates 5. When the cover 4 is installed over the enclosure 2, the plates 5 are slidable along the grooves 24 of the cover 4 until the channels 32 receive the outer rib 30 of the cover 4. The cover 4 overlaps the plates 5 and prevents removal of the plates 5.

Figure 13:
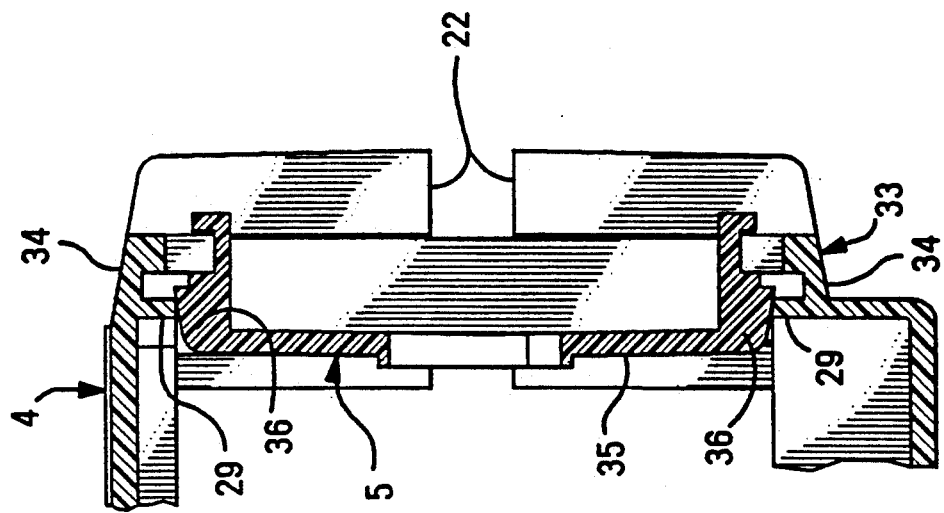
FIG. 13 is a view similar to FIG. 12, showing the plate assembled incorrectly to the base, and preventing assembly of the cover with the base.

With reference to FIGS. 10-13, the ribs 30 of the base 3 extend in a ledge 33 extending around the periphery of the enclosure 2, and extending in an overhang beyond the mounting surface provided by the bottom 7. The rib 30 is on the ledge 33. A chamfer 34, FIGS. 11-13, is along an exterior underside of the ledge 33.

A similar but oppositely inclined chamfer 34 of the cover 4, FIGS. 3 and 11, is along an exterior periphery of the cover 4, and intersects the plate receiving openings 21. The plates 5 each have exterior bezels 35, FIGS. 11-13, adapted for receipt in the plate receiving openings 21 of the cover 4. At the ends of the plates 5, top and bottom ends 36 of the bezels 35 overlap the channels 32 of the plates 5, and extend outwardly, top and bottom, beyond the channels 32 to fill the plate receiving openings 21 of the base 3 and of the cover 4. At the sides of the plates 5, the bezels 25 bridge between the columns 23 to fill the plate receiving openings 21. The bezels 35 are adapted for being flush with the sides of the enclosure 2. At the sides of the plates, the flanges 27 of the plates 5 extend outwardly beyond the bezels 35, FIG. 8, to register in respective grooves 24 of the columns 23. The flanges 27 are inward behind the bezels 35 to be hidden when the bezels 35 fill the plate receiving openings 21. The ends 36 of the bezels are received in cut outs 37 in the respective chamfers 34 of the cover 4 and of the base 3. The ends 36 of the bezels have chamfers flush with the chamfers 34 of the cover 4 and of the base 3.

The plates 5 comprise a feature that prevents installation of the plates 5 inside out in the plate receiving openings 21, FIG. 13. When one of the plates 5, for example, is installed inside out, as shown in FIG. 13, one end 36 of the bezel impinges against the inner rib 29 of the base 3. The inner rib 29 is taller than the outer rib 30, and resists movement of the plate 5 far enough to interlock the projections 27 of the flanges 26 with the detents 25. Similarly, the projecting end 36 of the bezel 35 impinges against the taller inner rib 29 of the cover 4 to resist complete insertion of the plate 5 along the plate receiving opening 21 of the cover 4, and to prevent the cover 4 from meeting the base 3 along the parting line 22, FIG. 13.

The columns 23 of the enclosure 2 are beveled flush with the respective chamfers 34 of the cover 4 and of the base 3. Each column 23 at a corner of the enclosure 2 is convex curved, and provides a corresponding curve in the sides of the enclosure 2. Each column 23 at a corner is smoothly beveled, following along the curve, flush with the chamfers 34, also smoothly curved around the corners, of the cover 4 and of the base 3.

The spindle 15, FIGS. 3 and 5, is braced by a channel 38 that bridges the opening 8. The base 3 has an integral, hollow mounting post 39 that is integral with the channel 38, and that projects outwardly from the channel 38, from the enclosure 2 toward the cover 4.

Figure 2:
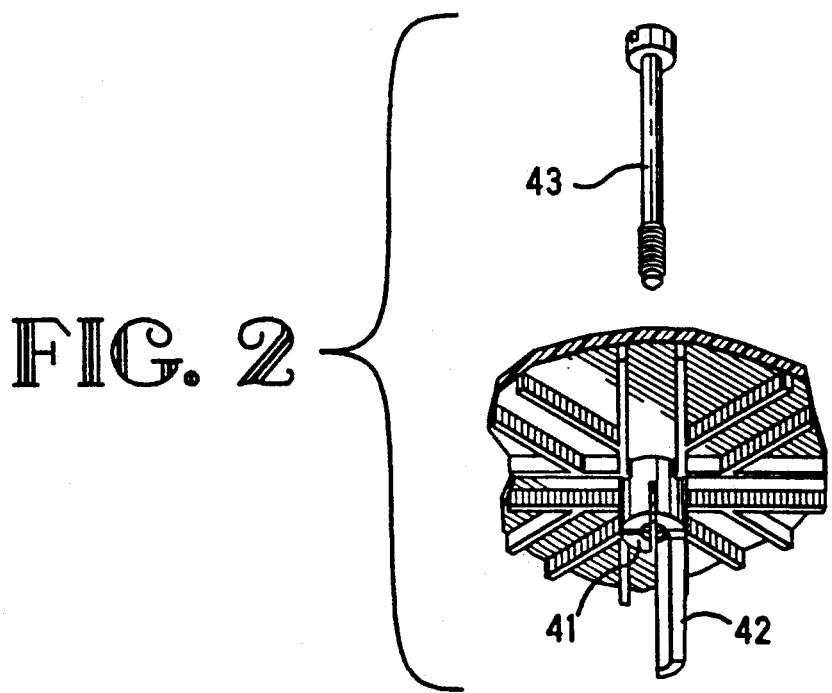
FIG. 2 is a fragmentary view of a cover of the outlet and a fastener.

A portion of the post 39 is cut away to provide an elongated, recessed keyway 40 along the mounting post 39. The cover 4, FIG. 2, has a central projecting, hollow hub 41 from which projects an elongated key 42 for receipt along the keyway 40, to orient the cover 4 with the base 3. The hub 41 is slit partially through to provide segmented spring, gripping fingers that encircle and grip the shank of an elongated fastener 43 used to secure the cover 4 to the mounting post 39, in that the fastener 43 slidably extends in the hub 41 and in the mounting post 39. The fastener 43 can extend through the mounting post 39 and threadably secure to an internally threaded nut, not shown, on the exterior of the bottom 7. Alternatively the fastener 43 can be of a size to self tap into the mounting post 39. To remove the cover 4 from the enclosure 2, the fastener 43 is loosened, and is withdrawn partially from the mounting post 39. Since the hub 41 grips the fastener 43, the fastener 43 can be used as a handle, whereby, an upward pull on the fastener 43 will remove the cover 4 from the enclosure 2 without dislodging the plates 5.

The cover 4, FIG. 3, has an external stripe 44 of thickened material in which an elongated recess 45 is located so as to intersect the hollow hub 41. The hollow hub 41 has a counterbore 46 in the recess to countersink an enlarged head of the fastener 43. A label 47 fits in the recess 45 to hide the fastener 43 and camouflage the ease of entry into the enclosure 1. The label 47 is covered by a transparent plastics window pane 48 having end flanges 49 that clip to sides of the recess 45.

We claim:

1. A communication outlet for receiving communication cable to be terminated to a variety of data connectors, said outlet comprising an enclosure defined by an essentially planar, rectangular base and a planar, rectangular cover, where each said base and said cover is provided with a plurality of aligned spaced apart columns normal to said base and said cover, and adapted to retain said base and said cover in a spaced-apart parallel relationship, said columns including a groove for slidably receiving a wall section between said base and said cover, means for maintaining said wall section between said base and said cover against premature withdrawal, where said base further includes a cable receiving opening.

2. The communication outlet according to claim 1, wherein a plurality of wall sections are provided within each said groove about the periphery of said base and said cover.

3. The communication outlet according to claim 2, wherein certain of said wall sections include data connector receiving openings.

4. The communication outlet according to claim 1, wherein said columns are disposed at the respective corners of said base and said cover, and that columns are further provided along the sides thereof intermediate said corner columns, whereby wall sections may be inserted at selected positions about the periphery of said outlet.

5. The communication outlet according to claim 4, wherein each column at a corner of the enclosure is convex and follows a curve in the sides of the outlet.

6. The communication outlet according to claim 1, wherein the columns on the cover are stacked on the columns of the base, and that each column at a corner of the cover is convex and follows the curve in the sides of the outlet.

7. The communication outlet according to claim 1, wherein said wall section maintaining means include channels within said base and said cover, and that each said wall section includes elongated flanges for seating in said channels.

8. The communication outlet according to claim 1, wherein said base has a mounting surface, a reinforcing rib encircling the cable receiving opening and projecting into the outlet to define a bobbin for winding a communications cable received in said opening, at least one opening in said reinforcing rib communicating with the cable receiving opening, and flanges of the bobbin opposite corresponding openings through the mounting surface shaped like the edges of the flanges.

9. The communication outlet according to claim 2, wherein projecting flanges are provided no opposite sides of each of the wall sections adapted for sliding receipt along said grooves, and that said flanges are adapted for frictional interlocking with detents within said grooves when the grooves receive either one of the opposite sides of the wall sections.

10. The communication outlet according to claim 1, wherein a mounting post projects from said base toward the cover, where a fastener in said cover secures the cover to said mounting post.

11. The communication outlet according to claim 10, wherein a recessed keyway is provided along the mounting post, and a projecting key extends from said cover for alignment along said recessed keyway.

* * * * *